United States Patent
Hahm et al.

(10) Patent No.: US 8,284,819 B2
(45) Date of Patent: Oct. 9, 2012

(54) METHOD AND SYSTEM FOR INTERFERENCE SUPPRESSION IN WCDMA SYSTEMS

(75) Inventors: Mark Hahm, Hartland, WI (US); Wei Luo, Marlboro, NJ (US); Arkady Molev-Shteiman, Cliffwood, NJ (US); Hongwei Kong, Danville, NJ (US); Xiao-Feng Qi, Westfield, NJ (US); Li Fung Chang, Holmdel, NJ (US); Nelson Sollenberger, Farmingdale, NJ (US)

(73) Assignee: Broadcom Corporation, Irvine, CA (US)

( * ) Notice: Subject to any disclaimer, the term of this patent is extended or adjusted under 35 U.S.C. 154(b) by 419 days.

(21) Appl. No.: 12/582,771

(22) Filed: Oct. 21, 2009

(65) Prior Publication Data

US 2011/0090996 A1 Apr. 21, 2011

(51) Int. Cl.
*H04B 1/00* (2006.01)
(52) U.S. Cl. ...................................................... 375/148
(58) Field of Classification Search .................. 375/148, 375/267, 347
See application file for complete search history.

(56) References Cited

U.S. PATENT DOCUMENTS

| | | | | |
|---|---|---|---|---|
| 2007/0110137 A1* | 5/2007 | Guess et al. | ................... | 375/148 |
| 2009/0323796 A1* | 12/2009 | Futatsugi et al. | .............. | 375/232 |
| 2011/0007852 A1* | 1/2011 | Kimata | .......................... | 375/341 |

* cited by examiner

*Primary Examiner* — Don N Vo
(74) *Attorney, Agent, or Firm* — Sterne, Kessler, Goldstein & Fox PLLC (57) ABSTRACT

Aspects of a method and system for interference suppression in WCDMA systems may include one or more circuits that are operable to receive a plurality of multipath signals via one or more receiving antennas. A plurality of weighting factor values may be computed based on the received multipath signals. Estimated signals may be based on the weighting factor values. Residual signals may be generated based on received signals and the estimated signals. Addback signals may be generated based on the estimated signals and the residual signals. Updated estimated signals may be generated based on the addback signals and the weighting factor values. Incremental signals may be generated based on the updated estimated signals and addback signals. Updated residual signals may be generated based on the incremental signals and previous residual signals. The interference suppressed signals may be generated based on the updated residual signals and updated estimated signals.

18 Claims, 7 Drawing Sheets

METHOD AND SYSTEM FOR INTERFERENCE SUPPRESSION IN WCDMA SYSTEMS

CROSS-REFERENCE TO RELATED APPLICATIONS/INCORPORATION BY REFERENCE

NOT APPLICABLE.

FIELD OF THE INVENTION

Certain embodiments of the invention relate to signal processing. More specifically, certain embodiments of the invention relate to a method and system for interference suppression in WCDMA systems.

BACKGROUND OF THE INVENTION

Wideband code division multiple access (WCDMA) is a third generation (3G) cellular technology that enables the concurrent transmission of a plurality of distinct digital signals via a common RF channel. WCDMA supports a range of communications services that include voice, high speed data and video communications. One such high speed data communications service, which is based on WCDMA technology, is the high speed downlink packet access (HSDPA) service.

WCDMA is a spread spectrum technology in which each digital signal is coded or "spread" across the RF channel bandwidth using a spreading code. Each of the bits in the coded digital signal is referred to as a "chip". A given base transceiver station (BTS), which concurrently transmits a plurality of distinct digital signals, may encode each of a plurality of distinct digital signals by utilizing a different spreading code for each distinct digital signal. At a typical BTS, each of these spreading codes is referred to as a Walsh code. The Walsh coded digital signal may in turn be scrambled by utilizing a pseudo noise (PN) bit sequence to generate chips. An example of a PN bit sequence is a Gold code. Each of a plurality of BTS within an RF coverage area may utilize a distinct PN bit sequence. Consequently, Walsh codes may be utilized to distinguish distinct digital signals concurrently transmitted from a given BTS via a common RF channel while PN bit sequences may be utilized to distinguish digital signals transmitted by distinct BTSs. The utilization of Walsh codes and PN sequences may increase RF frequency spectrum utilization by allowing a larger number of wireless communications to occur concurrently within a given RF frequency spectrum. Accordingly, a greater number of users may utilize mobile communication devices, such as mobile telephones, Smart phones and/or wireless computing devices, to communicate concurrently via wireless communication networks.

A user utilizing a mobile communication device, MU1, may be engaged in a communication session with a user utilizing a mobile communication device MU2 via a base transceiver station, BTSA within wireless communication network. For example, the mobile communication device MU2 may transmit a digital signal to the BTSA, which the base transceiver station BTSA may then transmit to the mobile communication device MU1. The base transceiver station BTSA may encode signals received from the mobile communication device MU2 and transmitted to the mobile communication device MU1 by utilizing a Walsh code, W12, and a PN sequence, PNA. The mobile communication device MU1 may receive signals transmitted concurrently by a plurality of base transceiver stations (BTSs) in addition to the base transceiver station BTSA within a given RF coverage area. The mobile communication device MU1 may process the received signals by utilizing a descrambling code that is based on the PN sequence PNA and a despreading code that is based on the Walsh code W12. In doing so, the mobile communication device MU1 may detect a highest relative signal energy level for signals received from base transceiver station BTSA, which comprise a digital signal corresponding to mobile communication device MU2.

However, the mobile communication device MU1 may also detect signal energy from the digital signals, which correspond to signals from mobile communication devices other than the mobile communication device MU2. The other signal energy levels from each of these other mobile communication devices may be approximated by Gaussian white noise, but the aggregate noise signal energy level among the other mobile communication device may increase in proportion to the number of other mobile communication devices whose signals are received at the mobile communication device MU1. This aggregate noise signal energy level may be referred to as multiple access interference (MAI). The MAI may result from signals transmitted by the base transceiver station BTSA, which originate from signal received at the base transceiver station BTSA from mobile communication devices other than mobile communication device MU2. The MAI may also result from signals transmitted by the base transceiver stations BTSs other than the base transceiver station BTSA. The MAI and other sources of noise signal energy may interfere with the ability of MU1 to successfully decode signals received from MU2.

An additional source of noise signal energy may result from multipath interference. The digital signal energy corresponding to the mobile communication device MU2, which is transmitted by the base transceiver station BTSA, may disperse in a wavefront referred to as a multipath. Each of the components of the multipath may be referred to as a multipath signal. Each of the multipath signals may experience a different signal propagation path from the base transceiver station BTSA to the mobile communication device MU2. Accordingly, different multipath signals may arrive at different time instants at the mobile communication device MU2. The time duration, which begins at the time instant that the first multipath signal arrives at the mobile communication device MU2 and ends at the time instant that the last multipath signal arrives at MU2 is referred to as a delay spread. The mobile communication device MU2 may utilize a rake receiver that allows the mobile communication device MU2 to receive signal energy from a plurality of multipath signals received within a receive window time duration. For a given rake finger, which receives signal energy from a selected multipath signal, the given rake finger may also receive noise signal energy from other multipath signals in the multipath.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for interference suppression in WCDMA systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for interference suppression in WCDMA systems. In various embodiments of the invention, an interference cancellation module in a rake receiver may be operable to suppress interference signal levels relative to a desired signal received at a mobile communication device from a determined base transceiver station. The interference cancellation module may utilize an iterative method for interference cancellation based on maintained state information, for example residue data and estimated signal data. The iterative method may comprise a weighting iteration, one or more weighting and addback iterations, and an addback iteration.

During the weighting iteration, the interference cancellation module may compute weighting factor values based on received signals. The weighting factor values may correspond to a signal to noise ratio (SNR) measurement for the received signals. The interference cancellation processor may be operable to compute estimated signals based on the computed weighting factor values. The interference cancellation module may be operable to compute a residual signal based on a subtractive difference between the received signals and the computed estimated signals.

During the subsequent one or more weighting and addback iterations, the interference cancellation module may compute an addback signal based on a sum of the computed estimated signal and computed residual signal. The interference cancellation module may compute updated estimated signals based on the addback signals and weighting factor values. The interference cancellation module may compute an incremental signal based on a subtractive difference between the updated estimated signals and the addback signals. The interference cancellation module may compute an updated residual signal based on a subtractive difference between the incremental signals and the previously computed residual signals.

During a subsequent addback iteration, the interference cancellation module may be operable to compute interference suppressed signals based on a sum of the updated residual signals and the updated estimated signals. The interference suppressed signals may comprise suppressed interference signal levels relative to the received signals, in accordance with an embodiment of the invention.

A rake receiver may receive a plurality of multipath signals via a plurality of rake fingers. Each of the chip-level signals may comprise a multipath signal that is received via one or more receiving antennas, where each of the multipath signals may be transmitted by one or more base transceiver stations. At a given rake finger, the received multipath signal may comprise a desired signal, which was transmitted by a serving base transceiver station, and interference signal energy from signals that were transmitted by other base transceiver stations. In addition, the signal received by a given rake finger may comprise interference signal energy from signals received via other rake fingers.

In various embodiments of the invention, received signals may be descrambled based on one or more configured pseudo noise (PN) sequences, which correspond to one or more base transceiver stations from which the rake receiver may be configured to receive signals. Each of the descrambled signals may be despread based on a plurality of orthogonal variable spreading factor (OVSF) codes. The interference cancellation module may be operable to generate symbol-level signals corresponding to each of the despread signals. Each of the OVSF codes may correspond to an OVSF code, which may potentially be utilized in connection with signals transmitted by a base transceiver station. The interference cancellation module may be operable to compute a signal power level and/or noise power level for each of the symbol-level signals. The interference cancellation module may compute a weighting scale factor for each of the symbol-level signals based on the corresponding signal power level and noise power level. Based on the computed weighting scale factors, the interference cancellation module may compute estimated signal levels for each of the symbol-level symbols, for each potential OVSF code and for each configured PN sequence. Accordingly, the interference cancellation module may estimate a corresponding interference signal level for each of the estimated signal levels. Based on the estimated interference signal levels, the interference cancellation processor may generate interference suppressed signals by suppressing interference signal energy levels for each OVSF code and for each configured PN sequence.

Figure 1:
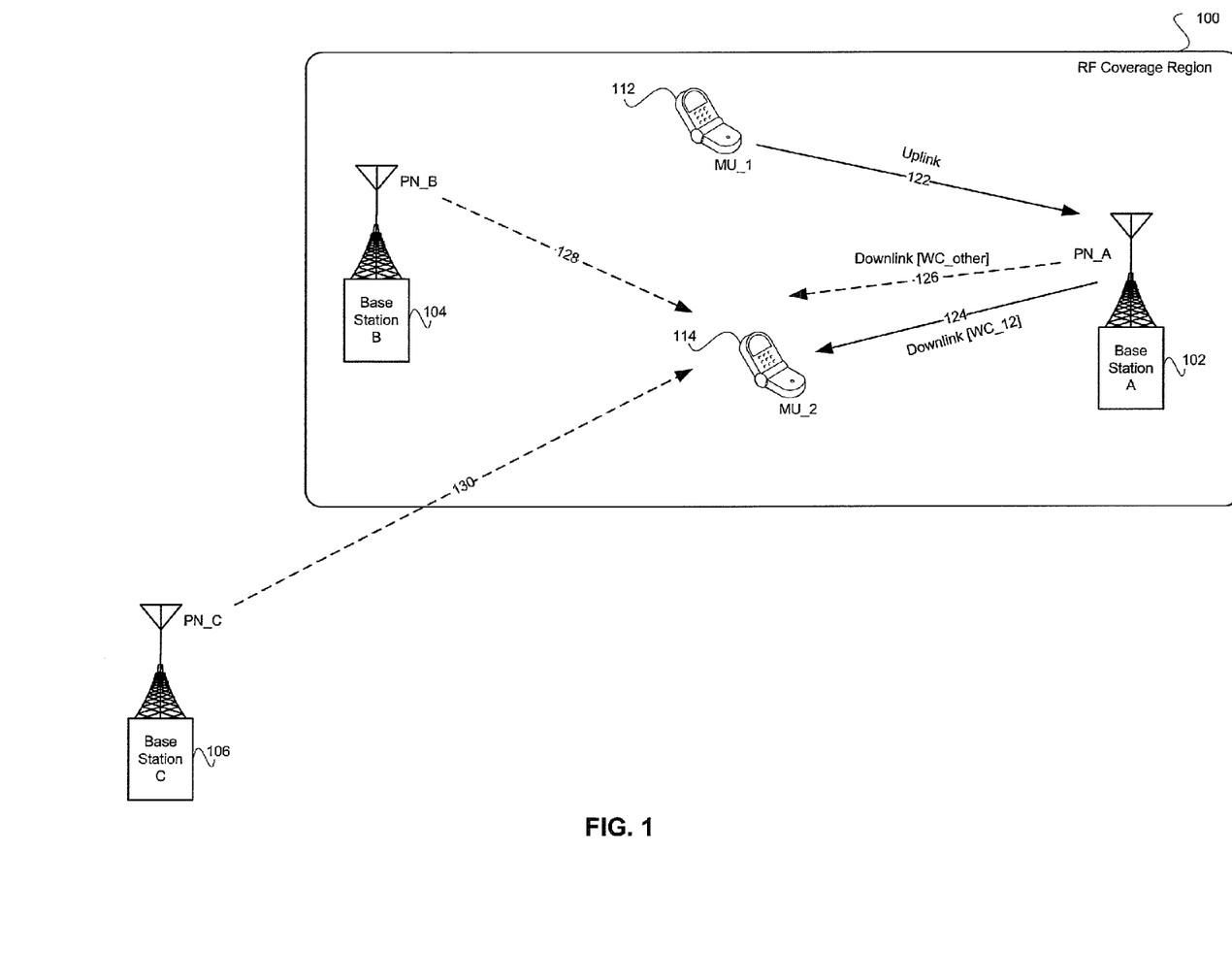
FIG. 1 is a diagram illustrating an exemplary wireless communication system, which is operable to provide interference suppression in WCDMA systems, in accordance with an embodiment.

FIG. 1 is an illustration of an exemplary wireless communication system, in accordance with an embodiment. Referring to FIG. 1, there is shown an RF coverage region 100 and a base station C 106. The RF coverage region 100 comprises base station A 102, base station B 104, mobile communication device MU_1 112 and mobile communication device MU_2 114. The base station 106 may be located outside of the RF coverage region 100. Each base station 102, 104 and 106 may transmit signals, which may be received by a communication device within an RF coverage area for that base station. The RF coverage area that is associated with a given base station is referred to as a cell.

The mobile communication devices MU_1 112 and MU_2 114 may be engaged in a communication via the base station A 102. The mobile communication device MU_1 112 may transmit signals to the base station A 102 via an uplink RF channel 122. In response, the base station A 102 may transmit signals to the mobile communication device MU_2 114 via a downlink RF channel 124. Signals transmitted by the base station A 102 may communicate chips that are generated utilizing a scrambling code PN_A. The signals transmitted via RF channel 124 may be spread utilizing a spreading code WC_12. The spreading code WC_12 may comprise an orthogonal variable spreading factor (OVSF) code, for example a Walsh code, which enables the mobile communication device MU_2 114 to distinguish signals transmitted by the base station A 102 via the downlink RF channel 124 from signals transmitted concurrently by the base station A 102 via other downlink RF channels, for example downlink RF channel 126. The base station A 102 may utilize one or more OVSF codes, WC_other, when spreading data transmitted via downlink RF channel 126. The one or more OVSF codes, WC_other, may be distinct from the OVSF code WC_12.

The mobile communication device MU_2 114 may receive MAI signals from RF channel 126, RF channel 128 and/or RF channel 130. As stated above, signals received via RF channel 126 may be transmitted by the base station A 102. Signals received via RF channel 128 may be transmitted by the base station B 104. Signals transmitted by the base station 104 may be scrambled based on a scrambling code PN_B. Signals received via RF channel 130 may be transmitted by the base station C 106. Signals transmitted by the base station C 106 may be scrambled based on a scrambling code PN_C.

The MU_2 114 may be operable to perform a soft handoff from the current serving base station A 102 to any of a plurality of base stations located within the RF coverage region 100, for example, the base station B 104. Accordingly, the MU_2 114 may be operable to process received signals based on scrambling code PN_A and/or scrambling code PN_B. In this regard, the mobile communication device MU_2 114 may listen for signals from both base station A 102 and base station B 104. The mobile communication device MU_2 114 may not be operable to perform a soft handoff from the current serving base station A 102 to a base station, which is outside of the RF coverage region 100, for example, the base station C 106. Accordingly, the mobile communication device MU_2 114 may not be operable to process received signals based on scrambling code PN_C. In this regard, MU_2 114 may not listen for signals from base station C 106.

While the desired signal at the mobile communication device MU_2 114 may be received via RF channel 124, the mobile communication device MU_2 114 may also receive signal energy via the RF channel 126, the RF channel 128 and/or the RF channel 130. The received signal energies from the RF channels 126, 128 and/or 130 may result in MAI, which may interfere with the ability of the mobile communication device MU_2 114 to receive desired signals via RF channel 124.

In various embodiments of the invention, the mobile communication device MU_2 may comprise suitable logic, circuitry and/or code that are operable to receive signal energy via the RF channels 124, 126, 128 and/or 130, and suppress interference signal energy received via the RF channels 126, 128 and/or 130. The mobile communication device MU_2 may utilize an iterative method for interference cancellation. The iterative method may comprise a weighting iteration, one or more weighting and addback iterations, and an addback iteration.

Various embodiments of the invention may be practiced at an exemplary mobile communication device MU_2 114 when the exemplary mobile communication device MU_2 114 is engaged in a communication with a wireless mobile communication device, wired communication device, and/or other communication device, which is operable to establish a communication with the exemplary mobile communication device MU_2 114.

Figure 2:
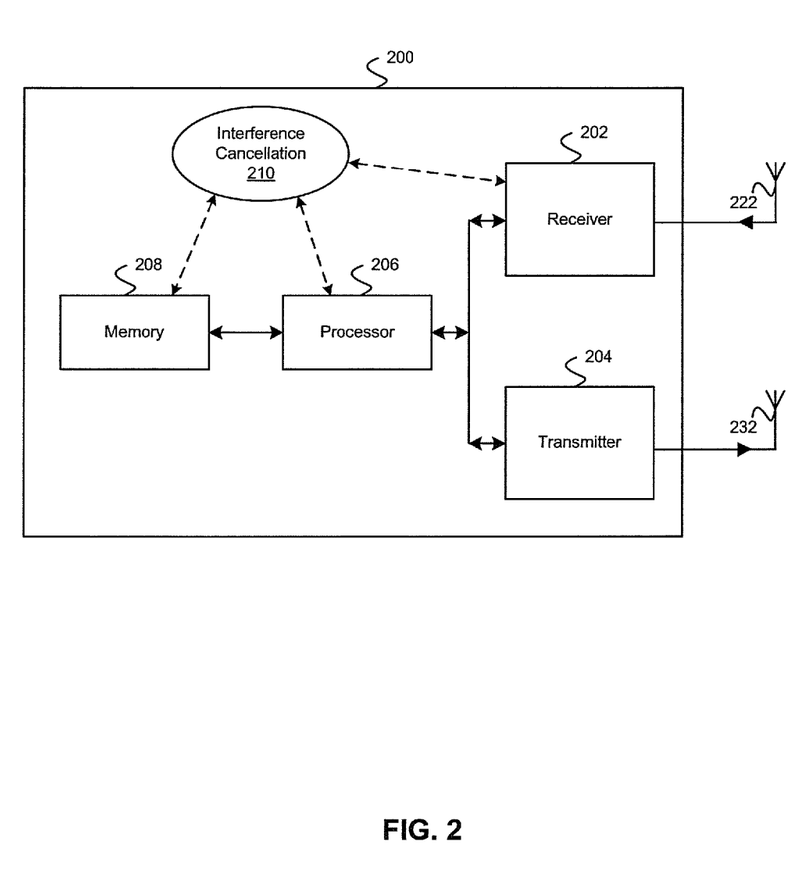
FIG. 2 is a diagram of an exemplary communication device, which is operable to provide interference suppression for WCDMA systems, in accordance with an embodiment of the invention.

FIG. 2 is a diagram of an exemplary communication device, which may utilize interference suppression for WCDMA systems, in accordance with an embodiment of the invention. Referring to FIG. 2, there is shown a transceiver system 200, a receiving antenna 222 and a transmitting antenna 232. The transceiver system 200 may comprise at least a receiver 202, a transmitter 204, a processor 206, an interference cancellation module 210 and a memory 208. Although a separate receiver 202 and transmitter 204 are shown in FIG. 2, the invention is not limited. In this regard, the transmit function and receive function may be integrated into a single transceiver block. The transceiver system 200 may also comprise a plurality of transmitting antennas and/or a plurality of receiving antennas, for example to support diversity transmission and/or diversity reception. Various embodiments of the invention may comprise a single antenna, which is coupled to the transmitter 204 and receiver 202 via a transmit and receive (T/R) switch. The T/R switch may selectively couple the single antenna to the receiver 202 or to the transmitter 204 under the control of the processor 206, for example.

The receiver 202 may comprise suitable logic, circuitry, interfaces and/or code that may be operable to perform receive functions that may comprise PHY layer function for the reception or signals. These PHY layer functions may comprise, but are not limited to, the amplification of received RF signals, generation of frequency carrier signals corresponding to selected RF channels, for example uplink or downlink channels, the down-conversion of the amplified RF signals by the generated frequency carrier signals, demodulation of data contained in data symbols based on application of a selected demodulation type, and detection of data contained in the demodulated signals. The RF signals may be received via the receiving antenna 222. The receiver 202 may process the received RF signals to generate baseband signals. A chip-level baseband signal may comprise a plurality of chips. The chip-level baseband signal may be descrambled based on a PN sequence and despread based on an OVSF code, for example a Walsh code, to generate a symbol-level baseband signal. The symbol-level baseband signal may comprise a plurality of data symbols. The receiver 202 may comprise a rake receiver, which in turn comprises a plurality of rake fingers to process a corresponding plurality of received multipath signals.

The transmitter 204 may comprise suitable logic, circuitry, interfaces and/or code that may be operable to perform transmit functions that may comprise PHY layer function for the transmission or signals. These PHY layer functions may comprise, but are not limited to, modulation of received data to generate data symbols based on application of a selected modulation type, generation of frequency carrier signals corresponding to selected RF channels, for example uplink or downlink channels, the up-conversion of the data symbols by the generated frequency carrier signals, and the generation and amplification of RF signals. The RF signals may be transmitted via the transmitting antenna 232.

The memory 208 may comprise suitable logic, circuitry, interfaces and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM).

The interference cancellation module 210 may comprise suitable logic, circuitry and/or code that are operable to suppress interference signals, relative to a desired signal, in a received signal. The received signal may comprise a desired signal and one or more interference signals. The interference cancellation module 210 may generate an interference suppressed version of the signal in which the signal level for the interference signals is reduced relative to the signal level for the desired signal.

In operation, the receiver 202 may receive signals via the receiving antenna 222. In an exemplary embodiment of the invention, the receiver 202 may comprise a rake receiver. The receiver 202 may communicate signals to the processor 206 and/or to the interference cancellation module 210.

The receiver 202 may generate timing information that corresponds to each of the fingers in the rake receiver portion of the receiver 202. Each of the fingers in the rake receiver may process a distinct one of a plurality of multipath signals that are received within a delay spread time duration. Based on received RF signals, the receiver may generate chip-level baseband signals. The receiver 202 may communicate the chip level baseband signals to the interference cancellation module 210. The rake receiver 202 may generate one or more symbol-level baseband signals based on a selected one or more OVSF codes and a selected one or more PN sequences. The symbol-level baseband signals may be communicated to the processor 206. The OVSF codes may be selected based on a specified desired user signal. For example, referring to FIG. 1, the rake receiver 202 associated with mobile communication device MU_2 may select an OVSF code, WC_12, and a PN sequence, PN_A, which may then be utilized to generate the symbol-level baseband signal from the chip-level baseband signal.

The processor 206 may utilize common pilot channel (CPICH) information, communicated by the signals received from the receiver 202, to compute a plurality of channel estimate values or, in various embodiments of the invention, the receiver 202 may compute the channel estimate values. The processor 206 and/or receiver 202 may compute one or more channel estimate values corresponding to each multipath signal, which was transmitted by a given BTS and received at a finger in the rake receiver. The computed channel estimate values may be represented as a channel estimate matrix, $H_{bts,fgr}$, where bts represents a numerical index that is associated with a given BTS and fgr is a numerical index that is associated with a given rake finger. The processor 206 may communicate the computed channel estimate values to the receiver 202 and to the interference cancellation module 210 and/or to the memory 208. The processor 206 may compute and/or select one or more interference cancellation parameter values, which control the signal interference cancellation performance of the interference cancellation module 210. The processor 206 may communicate the interference cancellation parameter values to the interference cancellation module 210 and/or to the memory 208.

The processor 206 may also determine which BTSs are associated with a current RF coverage region 100 and which BTSs are not associated with the current RF coverage region 100. For example, the processor 206 may determine that the base station A 102 and the base station B 104 are associated with the current RF coverage region 100, while the base station C 106 is not associated with the current RF coverage region 100. In an exemplary embodiment of the invention, the processor 206 may store PN sequence for at least a portion of the BTSs that are associated with the current RF coverage region 100. For example, referring to FIG. 1, the processor 206 may generate and/or store corresponding PN sequences, for example PN_A and PN_B in the memory 208. The PN sequences PN_A and PN_B may be associated with the current RF coverage region 100.

In other exemplary embodiments of the invention, the processor 206 may store PN sequences for at least a portion of the BTSs that are associated with the current RF coverage region 100 and at least a portion of the BTSs that are not associated with the current RF coverage region 100. For example, referring to FIG. 1, the processor 206 may generate and/or store corresponding PN sequences, for example PN_A, PN_B and PN_C in the memory 208. In general, the processor 206 may store the PN sequences for the BTSs from which a mobile communication device, for example the mobile communication device MC_2 114, may expect to receive signals and the processor 206 may store PN sequences from which the mobile communicating device may not expect to receive signals. The mobile communication device may expect to receive signals, for example common pilot channel (CPICH) signals, from a plurality of BTSs in anticipation of a soft handoff from a current service BTS to a subsequent serving BTS.

In instances in which the transceiver system 200 utilizes a plurality of receiving antennas, for example the receiving antennas 222_1 and 222_2, the transceiver system 200 may utilize receive diversity. In a receive diversity system, the receiver 202 may receive a first set of signals via the receiving antenna 222_1 and a second set of signals via the receiving antenna 222_2. The processor 206 may compute a first set of channel estimate values corresponding to receiving antenna 222_1 and a second set of channel estimate values corresponding to receiving antenna 222_2. The computed channel estimate values may be represented as a channel estimate matrix, $H_{bts,rx,fgr}$, where rx represents a numerical index that is associated with a given receiving antenna. In various embodiments of the invention, which utilize receive diversity, the receiver 202 and/or the interference cancellation module 210 may also process signals that are transmitted by BTSs, which utilize signal transmission diversity.

The interference cancellation module 210 may receive signals from the receiver 202, which correspond to received multipath signals. The signals received by the interference cancellation module 210 may comprise chip-level baseband signals. A plurality of chips, for example 256 chips, may be associated with a data symbol. The interference cancellation module 210 may be operable to determine a time duration that corresponds to a data symbol processing period. The interference cancellation module 210 may be operable to determine whether to perform iterations of a signal interference suppression method on received chip-level baseband signals and/or symbol-level baseband signals, in accordance with an embodiment of the invention, during each data symbol processing period. The determination of whether to perform iterations of the signal interference suppression method may be based on, for example, the time instants at which chips, which are associated with a current data symbol and/or subsequent data symbol, arrive at the receiver 202 via received RF signals.

The interference cancellation module 210 may retrieve a plurality of channel estimate values, one or more PN sequences, a plurality of OVSF codes, and one or more interference cancellation parameter values from memory 208. The interference cancellation module 210 may receive timing information from the receiver 202 that corresponds to each of the fingers in the rake receiver portion of the receiver 202.

The interference cancellation module 210 may process received signals, utilizing received timing information, channel estimate values to combine the multipath signals, which are associated with corresponding fingers in the rake receiver. In various embodiments of the invention, the interface cancellation module 210 may combine the multipath signals to generate a combined chip-level signal by utilizing, for example, maximal ratio combining (MRC) and/or equal gain combining (EGO). The interference cancellation module 210 may process the combined chip-level signal, by utilizing PN sequences and OVSF codes, to determine a signal level associated with each of the plurality of OVSF codes for each of one or more selected PN sequences. In an exemplary embodiment of the invention, the plurality of OVSF codes comprises 256 Walsh codes. Each signal associated with an OVSF code may be referred to as a corresponding user signal. For example, a signal associated with a $j^{th}$ OVSF code may be referred to as a $j^{th}$ user signal. Referring to FIG. 1, for example, the OVSF code WC_12 may be associated with a user signal that is transmitted from base station A 102 to the mobile telephone MC_2 114.

The interference cancellation module 210 may compute a signal power level value and a noise power level value corresponding to each of the user signals. Based on the computed signal power level value, noise power level value and the one or more interference cancellation parameter values, the interference cancellation module 210 may compute a weighting factor value corresponding to each user signal. The plurality of weighting factor values associated with each BTS may be represented as a weighting factor matrix, $A_{bts}$, where bts represents a numerical index value that is associated with a given BTS. In an exemplary embodiment of the invention, the weighting factor values for a given BTS may be computed as shown in the following equations:

$$z(j) \cong \frac{\lambda x^2(j)}{\lambda x^2(j) + y^2(j)} \quad [1a]$$

when $$x^2(j) > \gamma y^2(j) \quad [1b]$$

and:

$$z(j) = 0 \quad [1c]$$

when $$x^2(j) \le \gamma y^2(j) \quad [1d]$$

where z(j) represents the weighting factor value for the $j^{th}$ user signal, $x^2(j)$ represents the signal power level value for the $j^{th}$ user signal, which was generated by descrambling a received signal based on a PN sequence for the given BTS, $y^2(j)$ represents the noise power level value for the $j^{th}$ user signal, which was generated by descrambling the received signal based on the PN sequence for the given BTS, and λ and γ represent interference cancellation parameter values.

The weighting factor values z(j) may correspond to a signal to noise ratio (SNR) measure for the $j^{th}$ user signal. Values for z(j) may be within the range $0 \le z(j) \le 1$. In one regard, values z(j) may be an a priori measure of confidence that a given user signal comprises valid signal energy that was transmitted by a BTS.

In various exemplary embodiments of the invention, a distinct user signal may be associated with a distinct OVSF code. However, various embodiments of the invention are not so limited may be practiced in exemplary embodiments in which a distinct user signal is associated with a plurality of OVSF codes.

The interference cancellation module 210 may be operable to process chip-level signals received from each of a plurality of rake fingers in the receiver 202 to generate corresponding interference suppressed chip-level signals based on an iterative method for interference cancellation, in accordance with an embodiment of the invention. The interference suppressed chip-level signals may be output to each corresponding rake finger. Each of the rake fingers may then process its respective interference suppressed chip-level signals.

The weighting factor value z(j) is a function of the interference cancellation parameter values λ and γ. In various embodiments of the invention, the interference cancellation parameters λ and γ may comprise integer and/or non-integer values. In an exemplary embodiment of the invention, λ=1 and γ=1. The processor 206 may be operable to monitor the interference cancellation performance of the interference cancellation module 210, for example by measuring SNR values for processed signals generated by the receiver 202 based on interference suppressed chip-level signals. Accordingly, the processor 206 may be operable to adjust one of both interference cancellation parameter values λ and γ.

Figure 3:
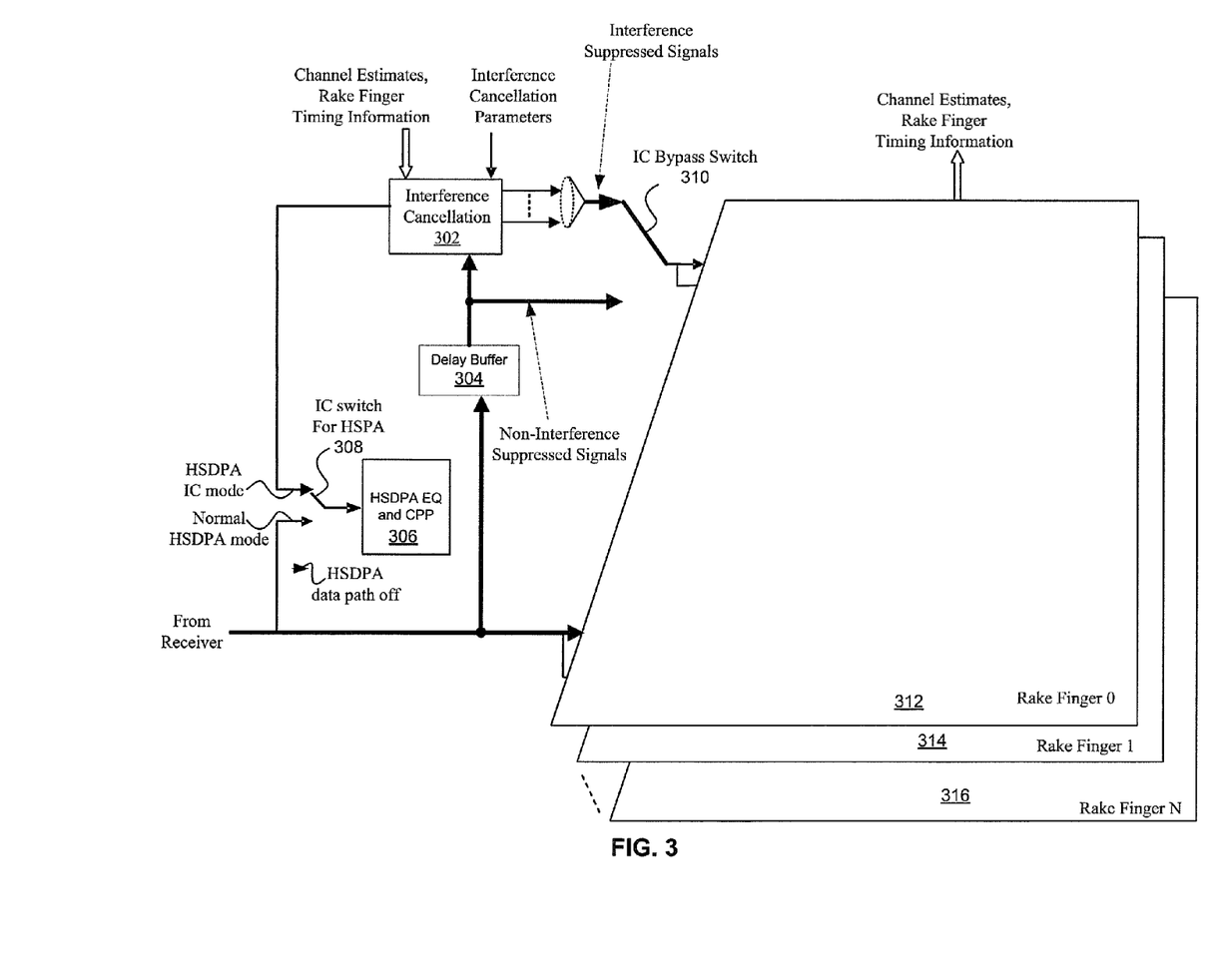
FIG. 3 is a diagram of an exemplary WCDMA receiver with interference suppression, in accordance with an embodiment of the invention.

FIG. 3 is a diagram of an exemplary WCDMA receiver with interference suppression, in accordance with an embodiment of the invention. Referring to FIG. 3, there is shown an interference cancellation module 302, a delay buffer 304, a HSDPA processor 306, an HSDPA switching device 308, interference cancellation (IC) bypass switching device 310, and a plurality of rake fingers 312, 314 and 316. The interference cancellation module 302 may correspond to the interference cancellation module 210 as presented in FIG. 2. The rake fingers 312, 314 and 316 represent fingers in a rake receiver. In an exemplary embodiment of the invention, the HSDPA switching device 308 and the IC bypass switching device 310 may be configured by the processor 206.

The delay buffer 304 may comprise suitable logic, circuitry, interfaces and/or code that may be operable to receive a signal level value as input at a given input time instant and output the signal level value at a subsequent output time instant. The time duration between the input time instant and the output time instant may be referred to as a delay time duration. In an exemplary embodiment of the invention, the delay time duration corresponds to 512 chips.

The HSDPA processor 306 may comprise suitable logic, circuitry, interfaces and/or code that may be operable to provide HSDPA processing of received signals.

In operation, the HSDPA switching device 308 may comprise suitable logic, circuitry, interfaces and/or code that are operable to select an input signal to the HSDPA processor 306. As shown in FIG. 3, the HSDPA switching device 308 is configured so that it is operable to supply an interference suppressed signal, generated by the interference cancellation module 302, as an input to the HSDPA processor 306. As indicated in FIG. 3, this configuration of the HSDPA switching device 308 may result in the HSDPA switching device 308 operating in a HSDPA interference cancellation (IC) mode.

The HSDPA switching device 308 may also be configured so that it is operable to supply a baseband signal, generated by the receiver 202, as an input to the HSDPA processor 306. As indicated in FIG. 3, this configuration of the HSDPA switching device 308 may result in the HSDPA switching device 308 operating in a normal HSDPA mode.

The HSDPA switching device 308 may also be configured such that no input signal is supplied to the HSDPA processor 306. As indicated in FIG. 3, this configuration of the HSDPA switching device 308 may result in the HSDPA switching device 308 operating in a HSDPA data path off mode.

The IC bypass switching device 310 may comprise suitable logic, circuitry, interfaces and/or code that are operable to select an input signal to the rake fingers 312, 314 and 316. As shown in FIG. 3, the IC bypass switching device 310 is configured so that it is operable to supply an interference suppressed signal, generated by the interference cancellation module 302, as an input to the rake fingers 312, 314 and 316.

The IC bypass switching device 310 may also be configured so that it is operable to supply a signal, which is output from the delay buffer 304, as an input to the rake fingers 312, 314 and 316. The signal output from the delay buffer 304 may comprise a time-delayed version of a baseband signal generated by the receiver 202. As indicated in FIG. 3, the signal output from the delay buffer 304 may comprise a non-interference suppressed signal.

Each of the rake fingers 312, 314 and 316 may receive, as input, a baseband signal generated by the receiver 202. Based on the respective input baseband signal from the receiver 202, each rake finger 312, 314 and 316 may generate channel estimates and rake finger timing information. In various embodiments of the invention, each rake finger 312, 314 and 316 may generate the channel estimates and/or rake finger timing information for selected multipath signals based on CPICH data received via the input baseband signals received from the receiver 202. In an exemplary embodiment of the invention, which comprises a receive diversity system, channel estimates and/or rake finger timing information may be generated for RF signals received at the receiver 202 via at least a portion of a plurality of receiving antennas. Each rake finger 312, 314 and 316 may communicate its respective channel estimates and/or rake finger timing information to the interference cancellation module 302.

In various embodiments of the invention, the interference cancellation module 302 may receive chip-level signals from the delay buffer 304. Based on the channel estimates and rake finger timing information, the interference cancellation module 302 may select individual multipath signals from the chip-level signals received via the delay buffer 304. Based on the interference cancellation parameters, the interference cancellation module 302 may process received chip-level multipath signals by utilizing an iterative method for interference cancellation, in accordance with an embodiment of the invention.

The chip-level signals received from the delay buffer 304 may comprise a plurality of multipath signals received from one or more BTSs. The interference cancellation module 302 may be configurable to assign signal processing resources to perform the iterative method of interference cancellation for selected multipath signals. The selected multipath signals may be received from one or more BTSs. The processor 206 may configure the interference cancellation module 302 to receive multipath signals from one or more BTSs. In an exemplary embodiment of the invention, which comprises a receive diversity system, the selected multipath signals may be received via one or more of a plurality of receiving antennas. The processor 206 may configure the interference cancellation module 302 for receive diversity.

The interference cancellation module 302 may receive interference cancellation parameters from the processor 206 and/or from the memory 208. In an exemplary embodiment of the invention, the interference cancellation module 302 may retrieve PN sequences and/or OVSF codes from the memory 208. In various embodiments of the invention, the interference cancellation module 302 may generate PN sequences and/or OVSF codes. The interference cancellation module 302 may retrieve and/or generate a PN sequence for each of the BTSs from which the interference cancellation module 302 is configured to attempt to receive a signal.

The interference cancellation module 302 may compute weighting factor values for each of the potential user signals contained within a given chip-level signal as shown, for example, in equations [1]. A plurality of weighting factors may be computed for each potential user signal, for each of the BTSs from which the interference cancellation module 302 is configured to receive a signal and/or for each receiving antenna from which the receiver 202 may receive a signal.

The interference cancellation module 302 may be operable to compute the weighting factors for a given receiving antenna and for a given BTS by combining received chip-level signals corresponding to the given receiving antenna, based on the corresponding channel estimate values, to generate combined chip-level signals. The interference cancellation module 302 may be operable to descramble the combined chip-level signals by utilizing a descrambling code based on the PN sequence corresponding to the given BTS. The interference cancellation module 302 may generate a user signal for each potential user by despreading the descrambled chip-level signals by utilizing a plurality of potential OVSF codes, for example Walsh codes. In an exemplary embodiment of the invention, the despreading of the descrambled chip level signals by the plurality of potential OVSF codes may comprise a Walsh transform operation. The exemplary Walsh transform operation may generate a plurality of user signals, for which each of the plurality of user signals may comprise a symbol-level baseband signal. The interference cancellation module 302 may be operable to compute a weighting factor, z(j), corresponding to a $j^{th}$ user signal based on the corresponding $j^{th}$ user symbol-level baseband signal. Each weighting factor, z(j), may be stored in the memory 208.

During a weighting iteration, the interference cancellation module 302 may be operable to multiply an initial $j^{th}$ user symbol-level baseband signal and the corresponding weighting factor value to generate a current estimated $j^{th}$ user symbol-level baseband signal. The current estimated $j^{th}$ user symbol-level baseband signal represents a first estimate of an interference suppressed version of the initial received signal.

The weighting iteration may be repeated for each user signal, for each BTS and/or for each receiving antenna and/or transmitting antenna. Each of the current estimated $j^{th}$ user symbol-level baseband signal may be stored in the memory 208. The current estimated symbol-level baseband signal for the potential users may be represented as shown in the following equation:

$$B_{rx}(1) = \sum_{bts=1}^{N\_BTS} \sum_{fgr=1}^{N\_FGR} A_{rx}(bts) C^H S^H(bts) H_{rx}(bts, fgr) Y_{rx}(fgr) \quad [2]$$

where $B_{rx}(1)$ represents a vector representation of current estimated symbol-level baseband signals for the potential users for signals received via a given receiving antenna rx, $A_{rx}(bts)$ represents a matrix representation for the weighting scale factors z(j) for the potential users for a given base station bts and for the given receiving antenna rx, $H_{rx}(bts,fgr)$ represents the channel estimate matrix $H_{bts,rx,fgr}$ for a given rake finger fgr, N_FGR represents the number of rake fingers 312, 314 and 316 in the rake receiver and N_BTS represents the configured number of base stations for the receiver 202, $Y_{rx}(fgr)$ represents the signal received via a given receiving antenna rx at a given rake finger fgr, $C^H$ represents a complex conjugate transformed version of a channelization matrix C and $S^H(bts)$ represents a complex conjugate transformed version of a PN sequence matrix S(bts). The matrix C may comprise a matrix representation of OVSF codes for the potential users and the matrix S(bts) may represent a PN sequences for the base station bts. In an exemplary embodiment of the invention, the matrix $C^H$ may comprise a Walsh transform matrix.

In various embodiments of the invention in which the receiver 202 utilizes a plurality of receiving antennas, data received via the symbol-level signals corresponding to the plurality of receiving antennas may be decoded by utilizing various diversity decoding methods. Various embodiments of the invention may also be practiced when the receiver 202 is utilized in a multiple input multiple output (MIMO) communication system. In instances where the receiver 202 is utilized in a MIMO communication system, data received via the symbol-level signals, received via the plurality of receiving antennas, may be decoded by utilizing various MIMO decoding and/or diversity decoding methods.

The interference cancellation module 302 may generate a current estimated chip-level signal by spreading each of the plurality of j estimated symbol-level baseband signals by a corresponding OVSF code. In an exemplary embodiment of the invention, the spreading of symbol-level baseband signals by the plurality of potential OVSF codes may comprise an inverse Walsh transform operation. The inverse Walsh transformed estimated symbol-level baseband signals may be scrambled by the corresponding PN sequence to generate current estimated chip-level baseband signals. For each scrambling operation a plurality, corresponding to the number of rake fingers 12, 314 and 316, of current estimated chip-level baseband signals may be generated. The inverse Walsh transform and spreading operations may be repeated for each of the BTSs and/or the receiving antennas.

During a subsequent weighting and addback iteration, the interference cancellation module 302 may subtract the current estimated chip-level baseband signals corresponding to a given receiving antenna from the received chip-level baseband signals corresponding to the given receiving antenna to generate a current residual chip-level signal corresponding to the given receiving antenna. The current residual chip-level signal represents an estimate of the noise and unsuppressed interference and desired signal level values in the received signal. In various embodiments of the invention, the current residual chip-level signal corresponding to a given antenna may be represented as shown in the following equation:

$$R_{rx,fgr}(2) = Y_{rx,fgr} - \sum_{bts=1}^{N\_BTS} H_{rx,fgr}(bts)S(bts)CB(1) \quad [3]$$

where $R_{rx,fgr}(2)$ represents the current residual chip level signal for rake finger fgr corresponding to receiving antenna rx, $Y_{rx,fgr}$ represents the chip-level signal for rake finger fgr wherein the chip-level signal was received via receiving antenna rx and $H_{rx,fgr}(bts)$ represents the channel estimate matrix $H_{bts,rx,fgr}$ for a given base station bts. In an exemplary embodiment of the invention, the matrix C may comprise an inverse Walsh transform matrix.

The interference cancellation module 302 may be operable to generate a plurality of current residual symbol-level baseband signals for each potential user for each BTS and/or receiving antenna based on corresponding current residual chip-level signals by a method as is substantially described above. For a current $j^{th}$ user residual symbol-level baseband signal, the interference cancellation module 302 may add the current estimated $j^{th}$ user symbol-level baseband signal, as computed during the weighting iteration, to generate a current $j^{th}$ user addback symbol-level baseband signal. The current $j^{th}$ user addback symbol-level baseband signal represents a first representation of the received signal as comprising an interference suppressed component (the current estimated $j^{th}$ user symbol-level baseband signal) and an interference component (the current $j^{th}$ user residual symbol-level baseband signal), which may be represented as shown in the following equation:

$$P_{rx}(2) = D_{rx}(2) + B_{rx}(1) \quad [4]$$

where P(2) represents a vector representation of the current addback symbol-level baseband signals for the potential users. D(2) represents a vector representation of the residual symbol-level baseband signals, which may be represented as shown in the following equation:

$$D_{rx}(2) = \sum_{bts=1}^{N\_BTS} \sum_{fgr=1}^{N\_FGR} A_{rx}(bts)C^H S^H(bts)H_{rx}(bts, fgr)R_{rx}(2)(fgr) \quad [5]$$

where $R_{rx}(2)(fgr)$ represents the current residual chip-level signal $R_{rx,fgr}(2)$.

The interference cancellation module 302 may be operable to multiply the current $j^{th}$ user addback symbol-level baseband signal and the corresponding weighting factor value to generate an updated estimated $j^{th}$ user symbol-level baseband signal. The updated estimated symbol-level baseband signals may be represented as shown in the following equation:

$$B_{rx}(2) = \sum_{bts=1}^{N\_BTS} A_{rx}(bts)[D_{rx}(2) + B_{rx}(1)] \quad [6]$$

where $B_{rx}(2)$ represents a vector representation of updated estimated symbol-level baseband signals for the potential users.

The interference cancellation module 302 may be operable to subtract the current estimated $j^{th}$ user symbol-level baseband signal, as computed during the weighting iteration, from the updated estimated $j^{th}$ user symbol-level baseband signal to generate an incremental estimated $j^{th}$ user symbol-level baseband signal. The incremental estimated $j^{th}$ user symbol-level baseband signal represents an adjustment to the first estimate of the interference suppressed version of the received signal level, which was computed during the weighting iteration. The incremental estimated symbol-level baseband signals may be represented as shown in the following equation:

$$L_{rx}(2) = B_{rx}(2) - B_{rx}(1) \quad [7]$$

where $L_{rx}(2)$ represents a vector representation of the incremental estimated symbol-level baseband signals.

The weighting and addback iteration may be repeated for each user signal, for each BTS and/or for each receiving antenna. Each updated estimated $j^{th}$ user symbol-level baseband signal may be stored in the memory 208.

The interference cancellation module 302 may be operable to generate an incremental estimated chip-level signal based on the incremental symbol-level baseband signals, for each potential user, for each BTS and/or for each receiving antenna, by performing inverse Walsh transform and spreading operations substantially as described above.

The interference cancellation module 302 may be operable to subtract the incremental estimated chip-level signals corresponding to a given receiving antenna from the current residual chip-level signal corresponding to the given receiving antenna to generate an updated residual chip-level signal for the given receiving antenna. The interference cancellation module 302 may generate an updated residual chip-level signal for each receiving antenna. In various embodiments of the invention, the updated residual chip-level signal corresponding to a given antenna may be represented as shown in the following equation:

$$R_{rx,fgr}(3) = R_{rx,fgr}(2) - \sum_{bts=1}^{N\_BTS} H_{rx,fgr}(bts)S(bts)CL(2) \quad [8]$$

where $R_{rx,fgr}(3)$ represents the updated residual chip level signal for rake finger fgr corresponding to receiving antenna rx.

In instances where the HSDPA processor 306 is operating in HSDPA IC mode, the interference cancellation module 302 may associate a cell identification value, cid, with each of the incremental estimated chip-level signals corresponding to a given receiving antenna. The cid value may identify an individual BTS. The interference cancellation module 302 may be operable to determine whether to subtract a given incremental estimated chip-level signal corresponding to the given receiving antenna from the current residual chip-level signal corresponding to the given receiving antenna based on the corresponding cid value for the incremental estimated chip-level signal. In various embodiments of the invention, each cid value may correspond to a PN sequence. In an exemplary embodiment of the invention, the interference cancellation module 302 may not subtract a given incremental estimated chip-level signal from the current residual chip-level signal when the corresponding cid value is associated with the current BTS from which the receiver 202 expects to receive signals. The resulting generated updated residual chip-level signal may be communicated to the HSDPA processor 306.

During an addback iteration, the interference cancellation module 302 may be operable to generate a plurality of updated residual symbol-level baseband signals for each potential user for each of the BTSs and/or the receiving antenna based on corresponding updated residual chip-level signals by a method, which is substantially described above. For a $j^{th}$ user updated residual symbol-level baseband signal, the interference cancellation module 302 may add the updated estimated $j^{th}$ user symbol-level baseband signal, as computed during the weighting and addback iteration, to generate a $j^{th}$ user interference suppressed symbol-level baseband signal. The interference suppressed symbol-level baseband signals may be represented as shown in the following equation:

$$P_{rx}(3) = D_{rx}(3) + B_{rx}(2) \quad [9]$$

where $P_{rx}(2)$ represents a vector representation of the interference suppressed symbol-level baseband signals for the potential users and $D_{rx}(3)$ represents the updated residual symbol-level signal based on $R_{rx,fgr}(3)$.

The interference cancellation module 302 may be operable to generate an interference suppressed chip-level baseband signal based on the interference suppressed symbol-level baseband signals, for each potential user, for each BTS and/or for each receiving antenna and/or transmitting antenna, by performing inverse Walsh transform and spreading operations substantially as described above. Each of the generated interference suppressed chip-level baseband signals may be communicated to a corresponding one of the rake fingers 312, 314 and 316.

In various embodiments of the invention, the rake fingers 312, 314 and 316 and/or HSDPA processor 306 may be operable to process the interference suppressed chip-level baseband signals. In instances in which the IC bypass switching device 310 is configured to select an output signal from the delay buffer 304, the rake fingers 312, 314 and 316 may process non-interference suppressed chip-level baseband signals. In instances in which the HSDPA switching device 308 is configured to place the HSDPA processor 306 in normal HSDPA mode, the HSDPA processor 306 may process non-interference suppressed chip-level baseband signals.

Figure 4A:
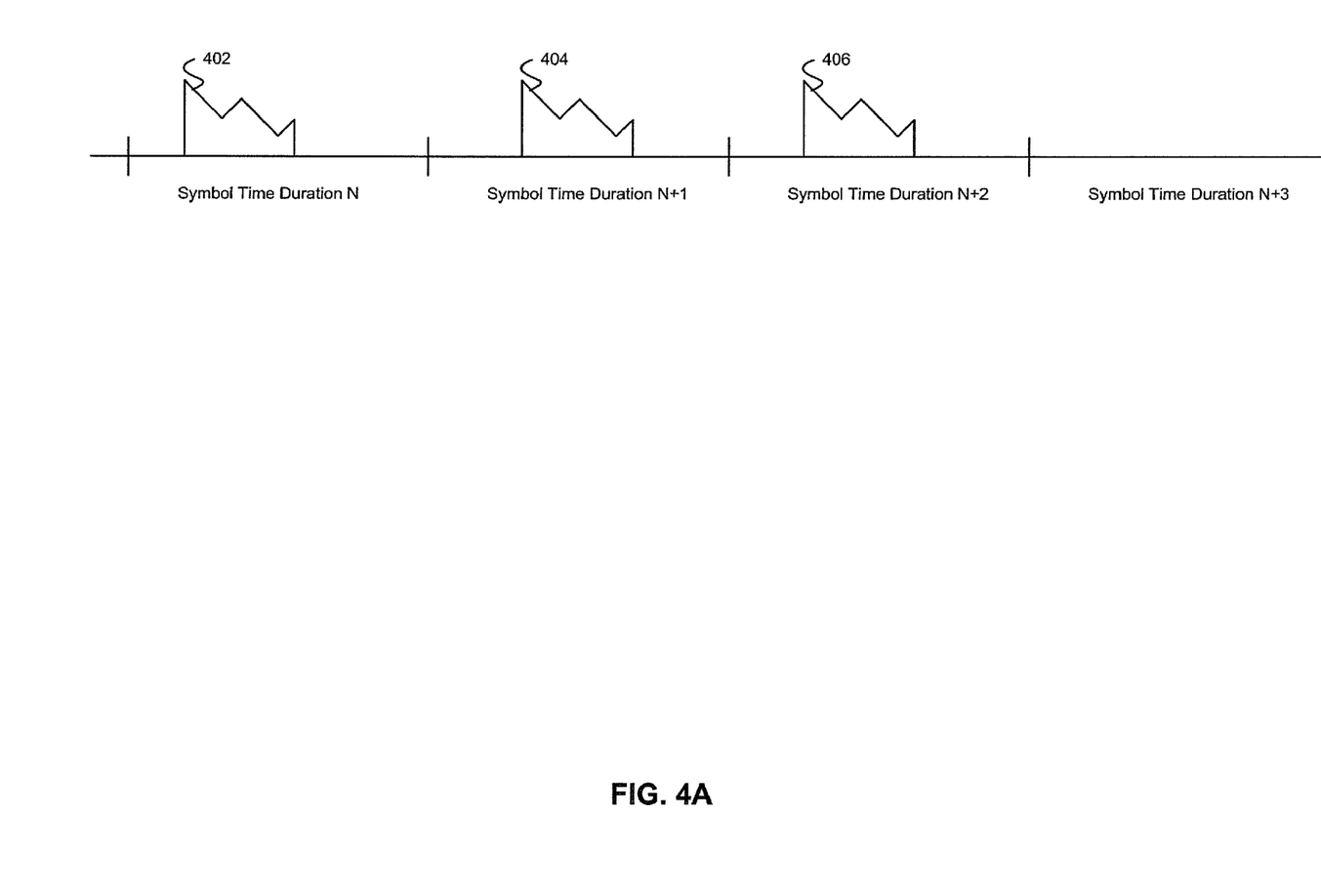
FIG. 4A is diagram illustrating exemplary interference cancellation in WCDMA systems, in accordance with an embodiment of the invention.

FIG. 4A is an exemplary illustration of interference cancellation in WCDMA systems, in accordance with an embodiment of the invention. Referring to FIG. 4A, there is shown a plurality of symbols 402, 404 and 406. The symbols may correspond to symbol time durations as shown in FIG. 4A. Each of the symbols may correspond to a time delayed output from the delay buffer 304. As shown in FIG. 4A, the symbol 402 corresponds to a symbol time duration N, the symbol 404 corresponds to a symbol time duration N+1 and the symbol 406 corresponds to a symbol time duration N+2.

In various embodiments of the invention, the interference cancellation module 302 may be operable to perform the weighting and addback iteration and the addback iteration for the symbol 402 during symbol time duration N. The interference cancellation module 302 may be operable to perform the weighting iteration for the symbol 404 during symbol time duration N. The interference cancellation module 302 may also be operable to compute channel estimate values for the processing of symbol 404 during symbol time duration N. The interference cancellation module 302 may be operable to compute weighting factor values for the processing of symbol 406 during symbol time duration N.

The interference cancellation module 302 may perform the weighting and addback iteration and the addback iteration for the symbol 404 during symbol time duration N+1. The interference cancellation module 302 may perform the weighting iteration for the symbol 406 during symbol time duration N+1. The interference cancellation module 302 may also compute channel estimate values for the processing of symbol 406 during symbol time duration N+1.

The interference cancellation module 302 may perform the weighting and addback iteration and the addback iteration for the symbol 406 during symbol time duration N+2.

Figure 4B:
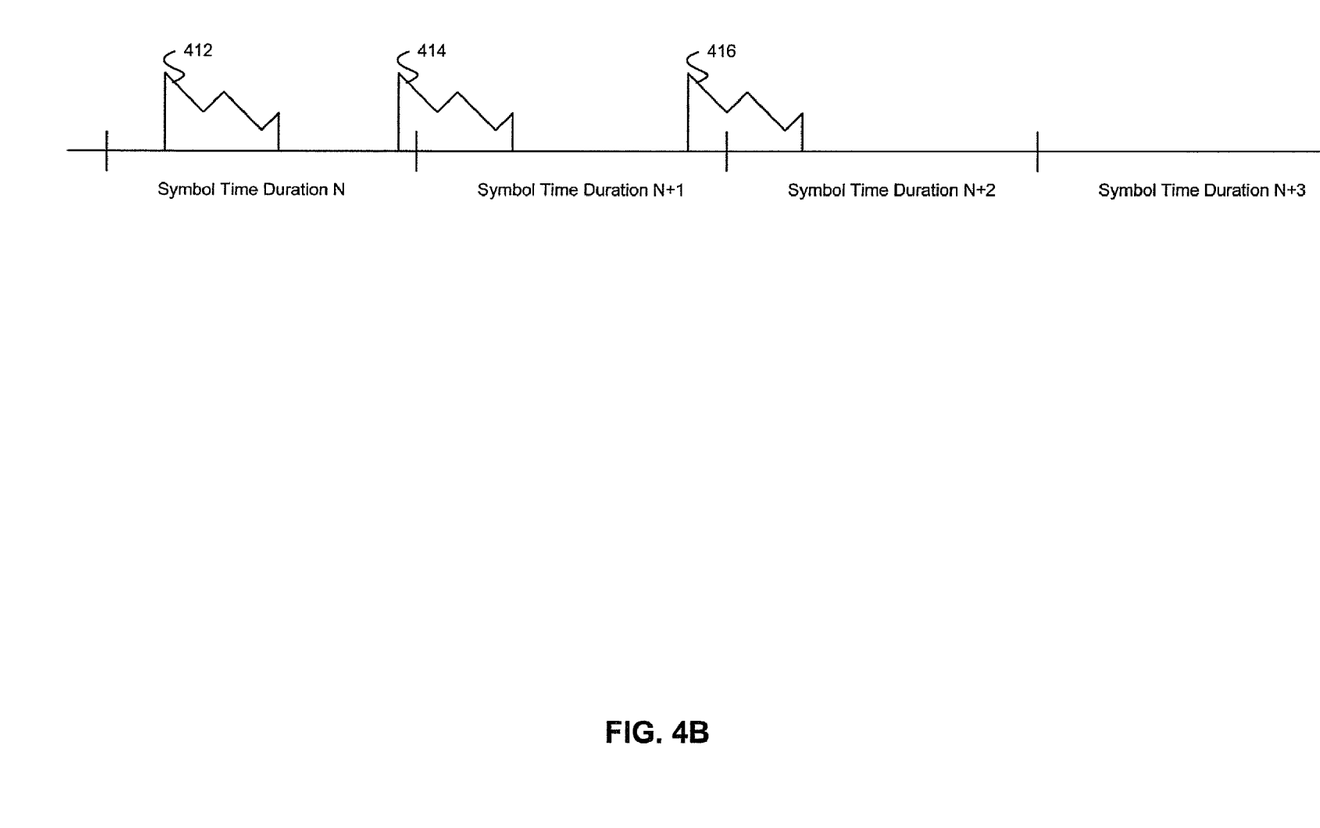
FIG. 4B is diagram illustrating exemplary interference cancellation bypass, in accordance with an embodiment of the invention.

FIG. 4B is an exemplary illustration of interference cancellation bypass, in accordance with an embodiment of the invention. Referring to FIG. 4B, there is shown a plurality of symbols 412, 414 and 416. As shown in FIG. 4B, the symbol 412 corresponds to a symbol time duration N. However, given that the symbol 414 begins during symbol time duration N, the symbol 414 also corresponds to symbol time duration N. Similarly, the symbol 416 corresponds to a symbol time duration N+1.

In various embodiments of the invention, the interference cancellation module 302 may be operable to perform the weighting and addback iteration and the addback iteration for the symbol 412 during the symbol time duration N. The interference cancellation module 302 may be operable to perform the weighting iteration for the symbol 416 during the symbol time duration N. The interference cancellation module 302 may also be operable to compute channel estimate values for the processing of the symbol 416 during the symbol time duration N. With regard to symbol 414, the processor 206 may configure the IC bypass switch 310 to select the output from the delay buffer 304. In this regard, the rake fingers 312, 314 and 316 may be operable to process non-interference suppressed signals when processing symbol 414.

The interference cancellation module 302 may be operable to perform the weighting and addback iteration and the addback iteration for the symbol 416 during the symbol time duration N+1.

Figure 4C:
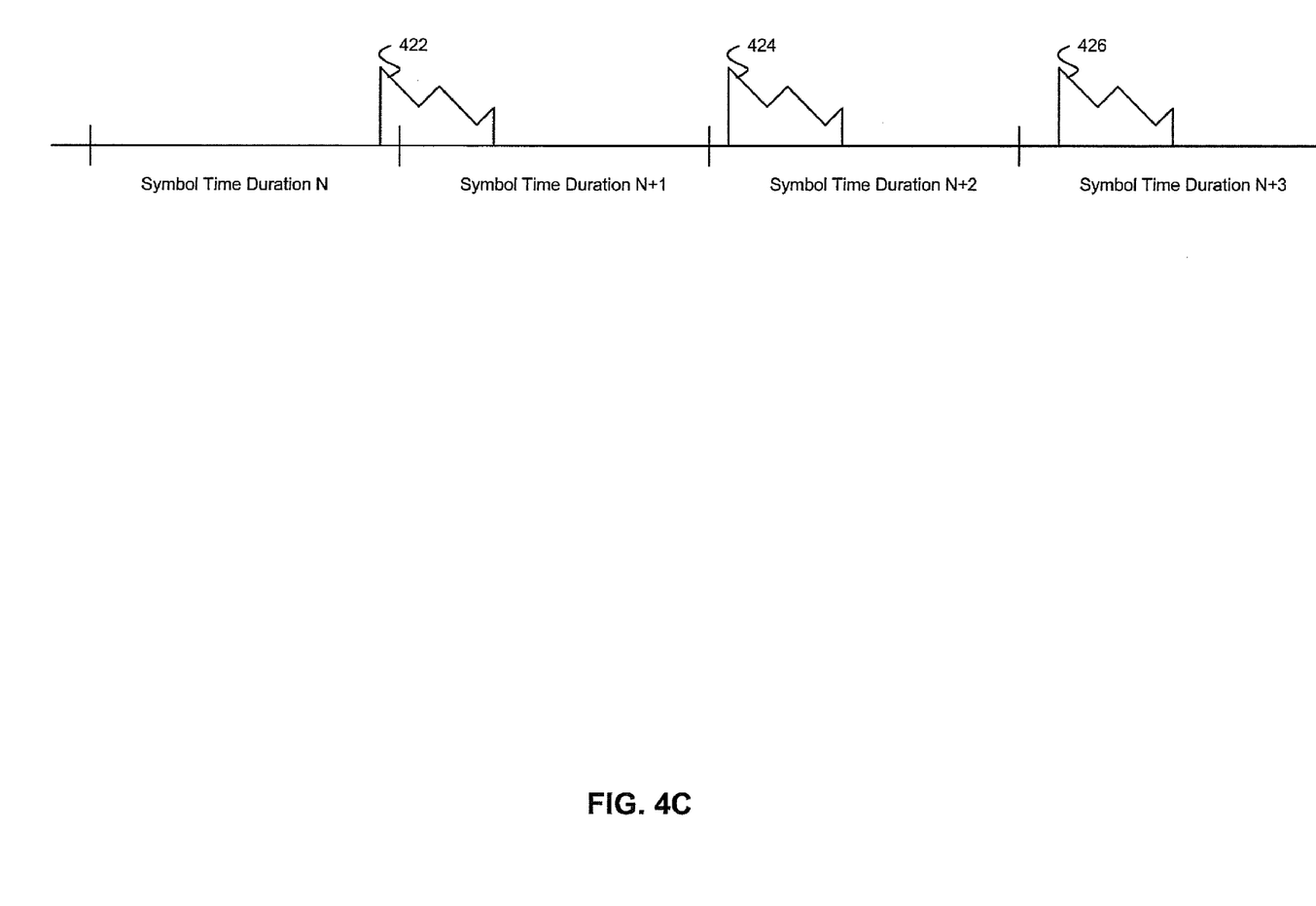
FIG. 4C is diagram illustrating exemplary interference cancellation bypass and suspended interference cancellation processing, in accordance with an embodiment of the invention.

FIG. 4C is an exemplary illustration of interference cancellation bypass and suspended interference cancellation processing, in accordance with an embodiment of the invention. Referring to FIG. 4C, there is shown a plurality of symbols 422, 424 and 426. As shown in FIG. 4C, the symbol 422 corresponds to a symbol time duration N, the symbol 424 corresponds to a symbol time duration N+2 and the symbol 426 corresponds to a symbol time duration N+3.

In various embodiments of the invention, the interference cancellation module 302 may be operable to perform the weighting and addback iteration and the addback iteration for the symbol 422 during the symbol time duration N. The interference cancellation module 302 may perform the weighting iteration for the symbol 424 during the symbol time duration N. The interference cancellation module 302 may also compute channel estimate values and/or weighting factor values for the processing of symbol 424 during the symbol time duration N.

During symbol time duration N+1, the interference cancellation module 302 may compute weighting factor values for the processing of symbol 426. The interference cancellation module 302 may suspend other interference cancellation processing during the symbol time duration N+1.

The interference cancellation module 302 may perform the weighting and addback iteration and the addback iteration for the symbol 424 during the symbol time duration N+2. The interference cancellation module 302 may perform the weighting iteration for the symbol 426 during the symbol time duration N+2. The interference cancellation module 302 may also compute channel estimate values for the processing of the symbol 426 during symbol time duration N+2.

The interference cancellation module 302 may perform the weighting and addback iteration and the addback iteration for the symbol 426 during symbol time duration N+3.

Figure 5:
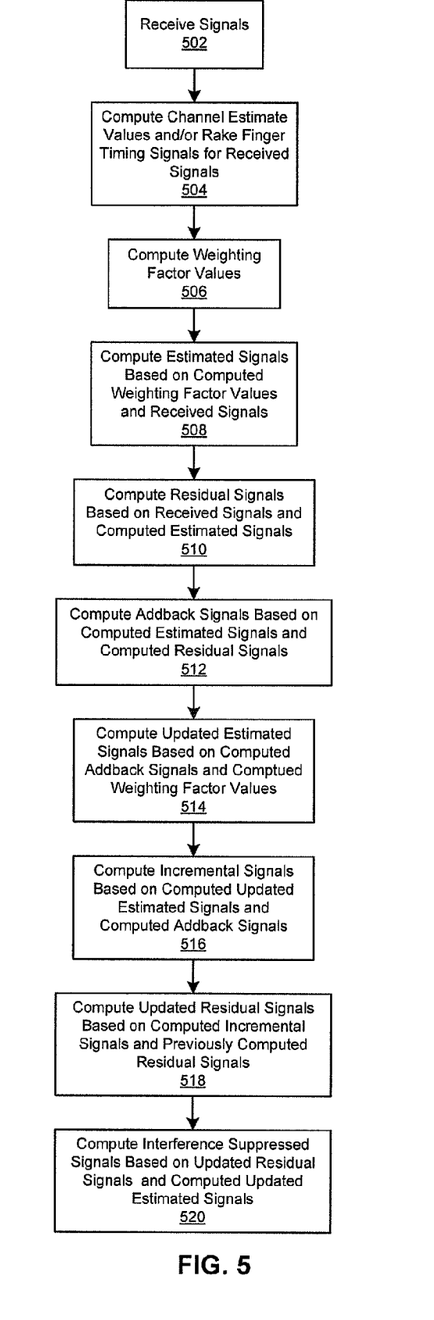
FIG. 5 is a flowchart that illustrates exemplary steps for interference suppression in WCDMA systems, in accordance with an embodiment of the invention.

FIG. 5 is a flowchart that illustrates exemplary steps for interference suppression in WCDMA systems, in accordance with an embodiment of the invention. In step 502, the receiver 202 may receive signals via one or more receiving antennas 222. In step 504, the receiver 202 may compute channel estimate values and/or rake finger timing signals for the received signals. In step 506, the interference cancellation module 302 may compute weighting factors z(j). In step 508, the interference cancellation module 302 may compute estimated signals based on the computed weighting factor value and received signals. In step 510, the interference cancellation module 302 may compute residual signals based on the received signals and computed estimated signals. In step 512, the interference cancellation module 302 may compute addback signals based on the computed estimated signals and computed residual signals. In step 514, the interference cancellation module 302 may compute updated estimated signals based on the computed addback signals and computed weighting factors. In step 516, the interference cancellation module 302 may compute incremental signals based on the computed updated estimated signals and computed addback signals. In step 518, the interference cancellation module 302 may compute updated residual signals based on the computed incremental signals and previously computed residual signals. In step 520, the interference cancellation module 302 may compute interference suppressed signals based on the updated residual signals and computed updated estimated signals.

Another embodiment of the invention may provide a machine and/or computer readable medium, having stored thereon, a computer program having at least one code section executable by a machine and/or computer, thereby causing the machine and/or computer to perform the steps as described herein for interference suppression in WCDMA systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for digital signal processing, the method comprising:
    performing by a receiver:
        receiving a plurality of multipath signals;
        descrambling the plurality of multipath signals based on a pseudo noise (PN) sequence to produce a plurality of descrambled multipath signals, wherein the PN sequence corresponds to a PN code utilized by a base transceiver station (BTS);
        generating a plurality of orthogonal variable spreading factor (OVSF) codes corresponding to potential OVSF codes utilized by the BTS;
        despreading the plurality of descrambled multipath signals based on the plurality of OVSF codes to produce a plurality of symbol level signals;
        computing a signal power level and a noise power level corresponding to the plurality of symbol-level signals:
        computing a plurality of weighting factor values based on the signal power level and the noise power level;
        generating a plurality of estimated signals based on the plurality of weighting factor values;

generating a plurality of residual signals based on the plurality of estimated signals; and generating a plurality of interference suppressed signals based on the plurality of residual signals.

2. The method according to claim 1, comprising generating a plurality of symbol-level signals by combining the plurality of received multipath signals.

3. The method according to claim 1, comprising generating the plurality of residual signals based on a subtractive difference between the plurality of received multipath signals and the plurality of estimated signals.

4. The method according to claim 1, comprising generating a plurality of addback signals based on an additive sum of the plurality of residual signals and the plurality of estimated signals.

5. The method according to claim 4, comprising generating a plurality of updated estimated signals based on the plurality of addback signals and the plurality of weighting factor values.

6. The method according to claim 5, comprising generating a plurality of incremental signals based on a subtractive difference between the plurality of updated estimated signals and the plurality of addback signals.

7. The method according to claim 6, comprising generating a plurality of updated residual signals based on a subtractive difference between the plurality of incremental signals and the plurality of residual signals.

8. The method according to claim 7, comprising generating the plurality of interference suppressed signals based on an additive sum of the plurality of updated residual signals and the plurality of updated estimated signals.

9. The method according to claim 1, wherein the computing a plurality of weighting factor values comprises concurrently computing a signal power level and a noise power level corresponding to the plurality of symbol-level signals within a single symbol time duration.

10. A system for digital signal processing, comprising:
a receiver configured to:
receive a plurality of multipath signals;
descramble the plurality of multipath signals based on a pseudo noise (PN) sequence to produce a plurality of descrambled multipath signals, the PN sequence corresponding to a base transceiver station (BTS);
generate a plurality of orthogonal variable spreading factor (OVSF) codes corresponding to potential OVSF codes utilized by the BTS;
despread the plurality of descrambled multipath signals based on the plurality of OVSF codes to produce a plurality of symbol level signals;
compute a signal power level and a noise power level corresponding to the plurality of symbol-level signals;
compute a plurality of weighting factor values based on the signal power level and the noise power level;
generate a plurality of estimated signals based on the plurality of weighting factor values;
generate a plurality of residual signals based on the plurality of estimated signals; and
generate a plurality of interference suppressed signals based on the plurality of residual signals.

11. The system according to claim 10, wherein the receiver is configured to generate a plurality of symbol-level signals by combining the plurality of received multipath signals.

12. The system according to claim 10, wherein the receiver is configured to generate the plurality of residual signals based on a subtractive difference between the plurality of received multipath signals and the plurality of estimated signals.

13. The system according to claim 10, wherein the receiver is configured to generate a plurality of addback signals based on an additive sum of the plurality of residual signals and the plurality of estimated signals.

14. The system according to claim 13, wherein the receiver is configured to generate a plurality of updated estimated signals based on the plurality of addback signals and the plurality of weighting factor values.

15. The system according to claim 14, wherein the receiver is configured to generate a plurality of incremental signals based on a subtractive difference between the plurality of updated estimated signals and the plurality of addback signals.

16. The system according to claim 15, wherein the receiver is configured to generate a plurality of updated residual signals based on a subtractive difference between the plurality of incremental signals and the plurality of residual signals.

17. The system according to claim 16, wherein the receiver is configured to generate the plurality of interference suppressed signals based on an additive sum of the plurality of updated residual signals and the plurality of updated estimated signals.

18. The system according to claim 10, wherein the receiver is configured to compute a plurality of weighting factor values by concurrently computing a signal power level and a noise power level corresponding to the plurality of symbol-level signals within a single symbol time duration.

* * * * *

UNITED STATES PATENT AND TRADEMARK OFFICE
CERTIFICATE OF CORRECTION

| | | |
|---|---|---|
| PATENT NO. | : 8,284,819 B2 | |
| APPLICATION NO. | : 12/582771 | |
| DATED | : October 9, 2012 | |
| INVENTOR(S) | : Hahm et al. | |

It is certified that error appears in the above-identified patent and that said Letters Patent is hereby corrected as shown below:

In column 9, line 6, please replace "(EGO)" with --(EGC)--.
In column 13, line 28, please replace "12" with --312--.
In column 18, lines 62-63, please replace "signals:" with --signals;--.
In column 19, line 48, please replace "symbol level" with --symbol-level--.

Signed and Sealed this
Fifteenth Day of January, 2013

David J. Kappos
*Director of the United States Patent and Trademark Office*